(No Model.)

H. R. FRISBIE.
VALVE.

No. 333,941. Patented Jan. 5, 1886.

WITNESSES:

INVENTOR
Henry R Frisbie
BY
Henry A Chapin
ATTORNEY

UNITED STATES PATENT OFFICE.

HENRY R. FRISBIE, OF CROMWELL, ASSIGNOR TO THE PRATT & CADY COMPANY, OF HARTFORD, CONNECTICUT.

VALVE.

SPECIFICATION forming part of Letters Patent No. 333,941, dated January 5, 1886.

Application filed April 27, 1885. Serial No. 163,514. (No model.)

*To all whom it may concern:*

Be it known that I, HENRY R. FRISBIE, a citizen of the United States, residing at Cromwell, in the county of Middlesex and State of Connecticut, have invented new and useful Improvements in Valves and Stop-Cocks, of which the following is a specification.

This invention relates to improvements in valves and stop-cocks, and pertains more particularly to that description of said articles designated as "globe-valves," the object being to provide improved devices attached to the diaphragm of the valve, and having a fixed relation to the moving valve proper, whereby the latter, when connected to the spindle of the valve by a special device, as hereinafter described, is prevented from moving laterally off from the spindle, and is properly guided in its motion, and also to provide an improved removable seat for the aforesaid class of valves.

Figure 1:
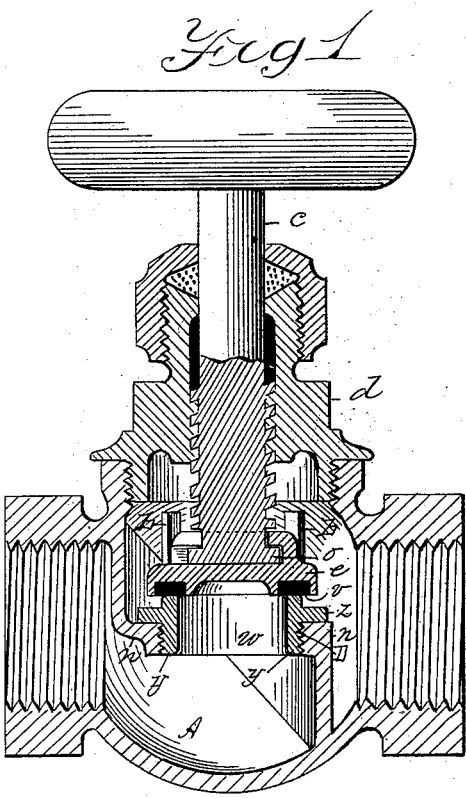
Figure 2:
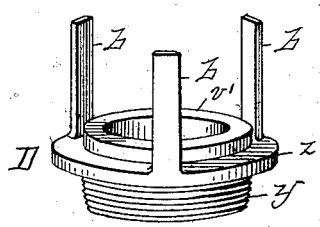
Figure 3:
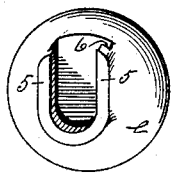

In the drawings forming part of this specification, Figure 1 is a longitudinal section of a globe-valve embodying my improvements. Fig. 2 is a perspective view of the removable seat of the valve, having thereon the valve-guides $b\ b\ b$; and Fig. 3 is a like view of the valve proper.

In the drawings, A is the body of the globe-valve, having therein the usual diaphragm, $n$, provided with the customary valve-opening therethrough, which opening is screw-threaded, as shown, and into the same is screwed the removable seat-ring D, said ring consisting of the screwed portion $y$, which is adapted to screw into said diaphragm, the projecting collar $z$, having a bearing on the diaphragm thereunder, and the upwardly-projecting seat for the valve, (lettered $v'$,) said ring being also provided with the upstanding valve-guides $b\ b\ b$, which are fixed thereto on collar $z$, a little removed from the side of the seat $v'$. In putting the seat-ring D into the diaphragm $n$ a washer of rubber or other suitable material may be placed under the collar $z$ should it be needed for preventing leakage through the screwed parts. Ordinarily, however, the common lead packing or cement will be sufficient to make that joint tight. The seat $v'$ on ring D is adapted to receive the flat-faced valve $e$, having any suitable rubber or other packing, $v$, attached thereto, although the common beveled valve-seat may be formed on ring D, if preferred, or any other suitable one. The said removable valve-seat is easily removed from the diaphragm for replacing a worn-out one by a new one, whereby the cost of a new body, A, is obviated, and for refinishing the face of the ring $v'$ when it has become imperfect and causes leakage. The spindle $c$ operates in the hub $d$ in the usual manner, and has a collar, $o$, around its lower end.

The valve proper, $e$, has formed on its upper side a socket to receive the lower end of the spindle $c$ and its collar $o$, consisting of a wall, 5, standing up at right angles to the face of the valve, the main portion of said wall being concentric with the border of the valve, but having an opening at one side, as shown. A groove, 6, is formed in the inner face of said wall, whereby provision is made for the reception in said socket of the collared end of the spindle $c$, as shown, whereby the latter and the valve are so connected that the spindle swivels or turns freely in the latter, and the valve is compelled to obey the movements lengthwise of the spindle, but no connection exists between the valve and the spindle to prevent the former from moving laterally off from the end of the latter; but the presence of the guides $b\ b\ b$ on the seat-ring D prevents any lateral movement of said valve and keeps it in a true position over the seat $v'$ as it moves up and down over the latter, the co-operation of said parts being as follows: The guides $b$ extend from the ring D toward the hub $d$ a sufficient distance to prevent the valve $e$, when lifted its maximum distance above the seat $v'$, from moving laterally, and thereby becoming disengaged from the spindle. The guides $b$ do not present a sufficient surface area to materially affect the freedom of the passage through the valve, and they obviate the necessity, which has heretofore existed in valve and spindle connections such as are herein shown, of some device or devices attached to either the valve or spindle, or both, whereby the former is so secured to the latter that it cannot become detached unintentionally.

In the construction herein shown the valve $e$ is put upon the end of the spindle or taken off from the latter while the hub and spindle are detached from the body A, and the movements of the valve to and from the seat $v'$ are always within the space inclosed by the guides $b$ and in the direction of the length of the latter.

What I claim as my invention is—

In combination with the shell or body of a valve having diaphragm-partition and screw-threaded aperture therein, the screw-threaded seat-ring D, having plane-faced valve-seat and upwardly-extending guides $b\ b$, the flat-faced valve $e$, of diameter to fit between and bear against guides $b$, and the operating-spindle by which said valve is moved, all substantially as set forth.

HENRY R. FRISBIE.

Witnesses:
WM. H. CHAPIN,
J. D. GARFIELD.